United States Patent
Tsai

(10) Patent No.: US 6,796,542 B2
(45) Date of Patent: Sep. 28, 2004

(54) SUPPORT APPARATUS FOR BALANCING THE CONNECTING GAP BETWEEN A LCD MODULE AND A COMPUTER MAINFRAME

(75) Inventor: Dui-Ming Tsai, Tai Shan Hsiang (TW)

(73) Assignee: Quanta Computer Inc., Taoyuan Shien (TW)

( * ) Notice: Subject to any disclaimer, the term of this patent is extended or adjusted under 35 U.S.C. 154(b) by 0 days.

(21) Appl. No.: 10/446,074

(22) Filed: May 28, 2003

(65) Prior Publication Data
US 2004/0140410 A1 Jul. 22, 2004

(30) Foreign Application Priority Data
Jan. 16, 2003 (TW) ..................................... 92200815 U

(51) Int. Cl.[7] .............................................. E04G 3/00
(52) U.S. Cl. ..................................... 248/291.1; 248/922
(58) Field of Search ....................... 248/291.1, 292.12, 248/292.13, 284.1; 16/273; 403/111, 120, 121, 325, 326, 327, 144, 145

(56) References Cited

U.S. PATENT DOCUMENTS

| | | | | |
|---|---|---|---|---|
| 5,107,401 A | * | 4/1992 | Youn | 361/683 |
| 6,505,382 B1 | * | 1/2003 | Lam et al. | 16/325 |
| 6,532,149 B2 | * | 3/2003 | Dhar et al. | 361/683 |
| 6,666,422 B1 | * | 12/2003 | Lu et al. | 248/291.1 |
| 6,684,456 B2 | * | 2/2004 | Lee | 16/335 |

* cited by examiner

Primary Examiner—Ramon O. Ramirez
Assistant Examiner—Kofi Schulterbrandt
(74) Attorney, Agent, or Firm—Rabin & Berdo, P.C.

(57) ABSTRACT

A support apparatus for balancing the connecting gap between a LCD module and a computer is described. The support apparatus has a roller, a roller support, a spring and a holder. The roller is connected to a LCD module and the holder is fixed to the computer mainframe. The roller support and the spring are located between the roller and the holder.

16 Claims, 3 Drawing Sheets

SUPPORT APPARATUS FOR BALANCING THE CONNECTING GAP BETWEEN A LCD MODULE AND A COMPUTER MAINFRAME

BACKGROUND OF THE INVENTION

1. Field of Invention

The present invention relates to a support apparatus. More particularly, the present invention relates to a support apparatus for balancing the connecting gap between a LCD module and a computer mainframe.

2. Description of Related Art

A notebook PC usually has a Liquid Crystal Display (hereafter LCD) module. In a notebook PC, a computer mainframe is connected pivotally to its LCD module. Usually, hinges are installed on two end sides of the connecting gap between a LCD module and a computer mainframe for preventing the connecting gap from being unbalanced.

As the LCD module design of a notebook PC evolves, a hinge is an essential installation in a middle section of a connecting gap between a LCD module and a computer mainframe. In cases where the hinge is mounted in the middle section of the connecting gap, the connecting gap is easily unbalanced.

Conventionally, two latches are attached to two sides of the computer mainframe and two pins are located in corresponding positions of the LCD module. When the two pins are located on the latch, the LCD module can be steady. However, two pins can't be located on the latch if the connecting gap is highly unbalanced.

SUMMARY OF THE INVENTION

It is therefore an objective of the present invention to provide to a support apparatus for balancing the connecting gap between a LCD module and a computer.

In accordance with the foregoing and other objectives of the present invention, a support apparatus for balancing the connecting gap between an LCD module and a computer is described. The support apparatus comprises a roller, a roller support, a spring and a holder. The roller is connected to an LCD module and the holder is fixed to the computer mainframe. The roller support and the spring are located between the roller and the holder.

In accordance with preferred embodiments of this invention, the position of the roller and the position of the holder are interchangeable. In other words, the roller and the holder can be respectively installed on either the LCD module or the computer mainframe. Plus, the spring and the roller support are installed between the roller and the holder. Two preferred embodiments of this invention can achieve the same purposes and advantages.

It is to be understood that both the foregoing general description and the following detailed description are examples only, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, with the description, serve to explain the principles of the invention. In the drawings.

DESCRIPTION OF THE PREFERRED EMBODIMENTS

Figure 1:
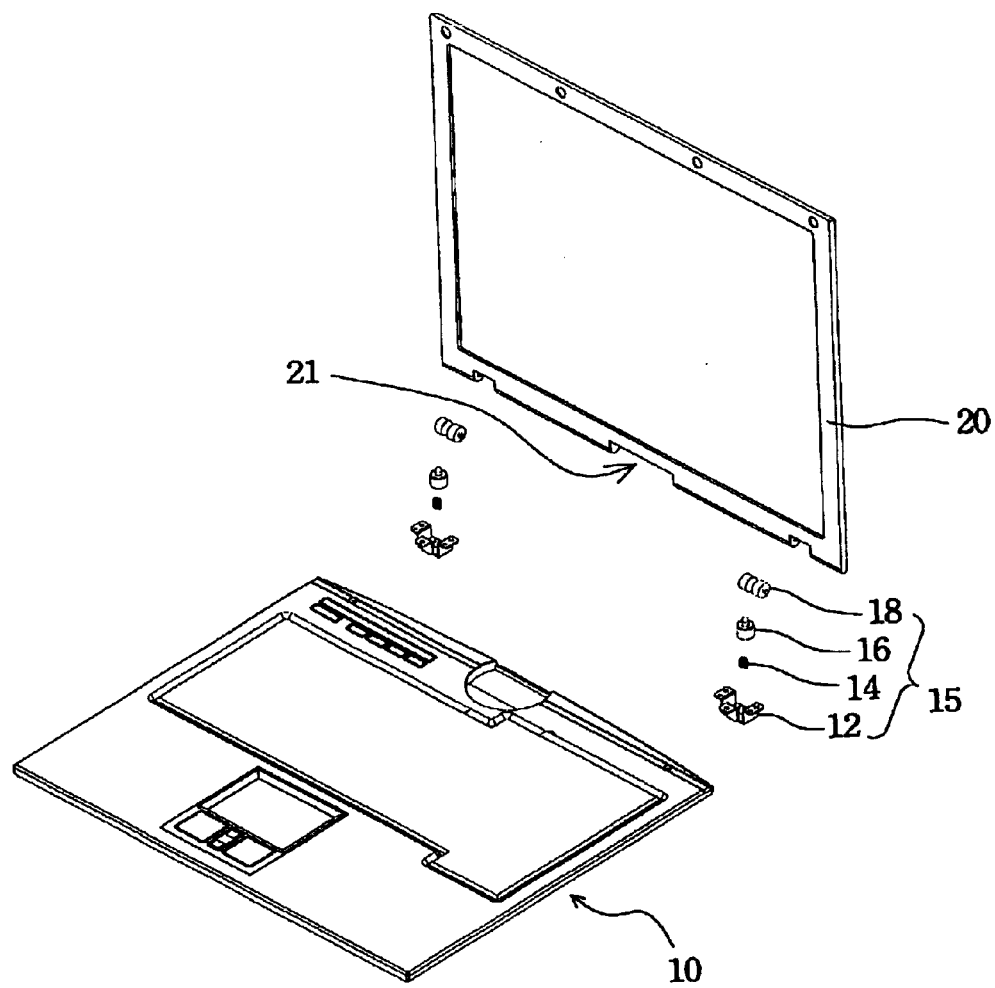
FIG. 1 illustrates an exploded view of support apparatus according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

The problem that the present invention targets is balancing the connecting gap between a LCD module and a computer mainframe. Before the preferred embodiments of the invention are described, the theory of the invention needs to be discussed first. When the connecting gap on two sides of a hinge balances, the LCD module receives the same torsion caused by the hinge. The method is to install a support apparatus for providing same balance torsion on two sides of a hinge in the connecting gap between a LCD module and a computer mainframe.

FIG. 1 illustrates an exploded view of a support apparatus according to one preferred embodiment of this invention. Referring to FIG. 1, LCD module 20 is connected pivotally to a computer mainframe 10 by a hinge 21. Support apparatuses 15 are installed in the connecting gap on two sides of the hinge 21. The support apparatus 15 comprises a roller 18, a roller support 16, a spring 14 and a holder 12. The roller 18 is connected pivotally to the LCD module 20 via a shaft (not shown). The positions of the roller 18 can be located on two sides of the hinge 21, preferably in symmetrical positions (for example, two rollers 18 have equal distances from the hinge 21). The holder 12 can be fixed to the computer mainframe 10 in corresponding positions of rollers 18 by several methods (for example by blots). Referring to FIG. 1 again, one end of the spring 14 is fastened to the holder 12, while the other end supports the roller support 16. The roller support 16 can lift the roller 18 by means of the spring 14's elastic forces.

Figure 2:
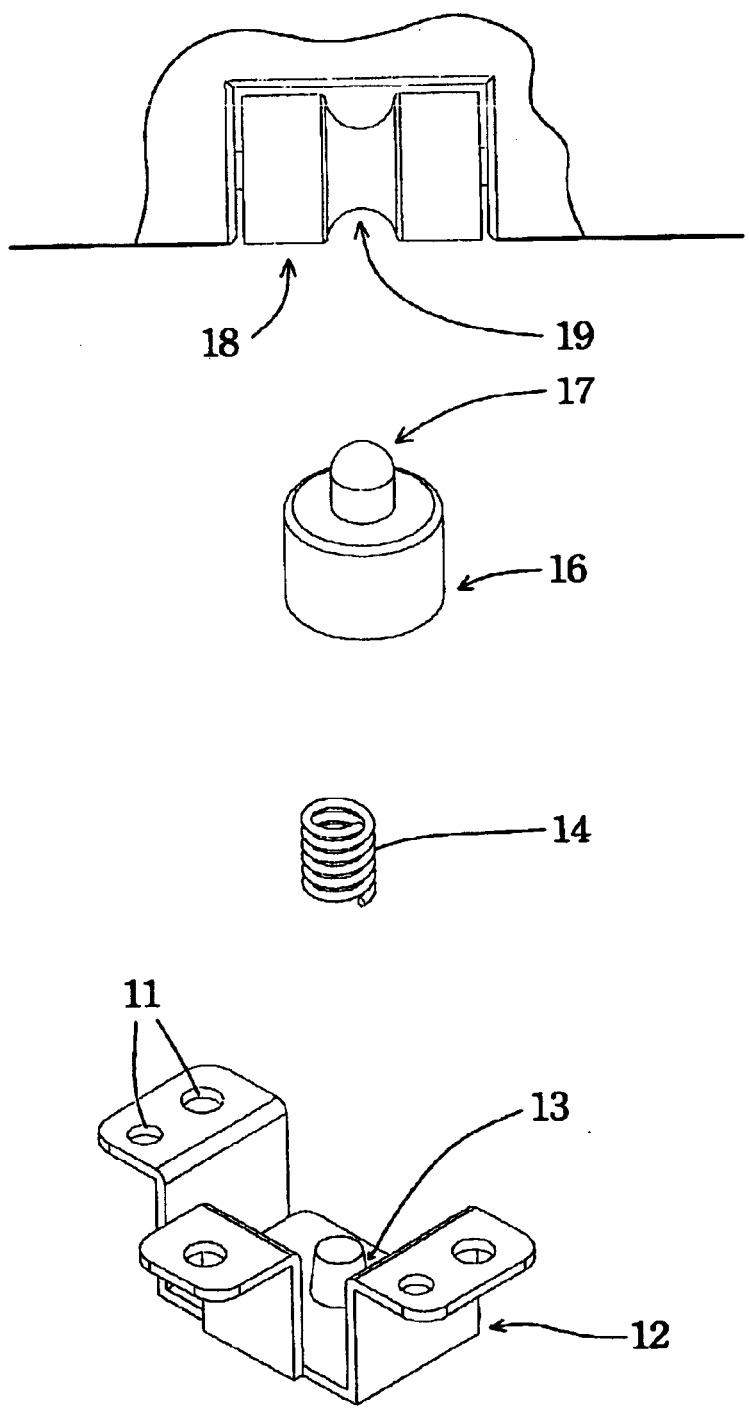
FIG. 2 illustrates an enlarged view of support apparatus in FIG. 1.

FIG. 2 illustrates an enlarged view of support apparatus in FIG. 1. In one preferred embodiment of the invention, a recess needs to be formed in the computer 10 before installing a holder 12. The holder 12 can be accordingly is fixed in the recess by fastening through screw holes 11. A cone pin 13 of holder 12 can prevent the spring 14 from position shifting. In this preferred embodiment, the spring 14 is employed to balance torsions on two sides of the hinge 21 and to lift roller support 16. The other elastic apparatus can be employed to replace the spring 14. The lift force depends on an elastic modulus of the spring 14. Thus, equal torsion on two sides of the hinge 21 can balance the connecting gap between a LCD module and a computer mainframe. One end of the roller support 16 is fastened to the spring 14, and the other end of the roller support 16 has a semi sphere 17 with a smooth surface to contact the roller 18. The roller 18 has a trench 19 around itself. The cross-sectional shape of the trench 19 is complementary to the shape of the semi sphere 17 so that the design can prevent positions of the roller support 16 and roller 18 from shifting.

Figure 3:
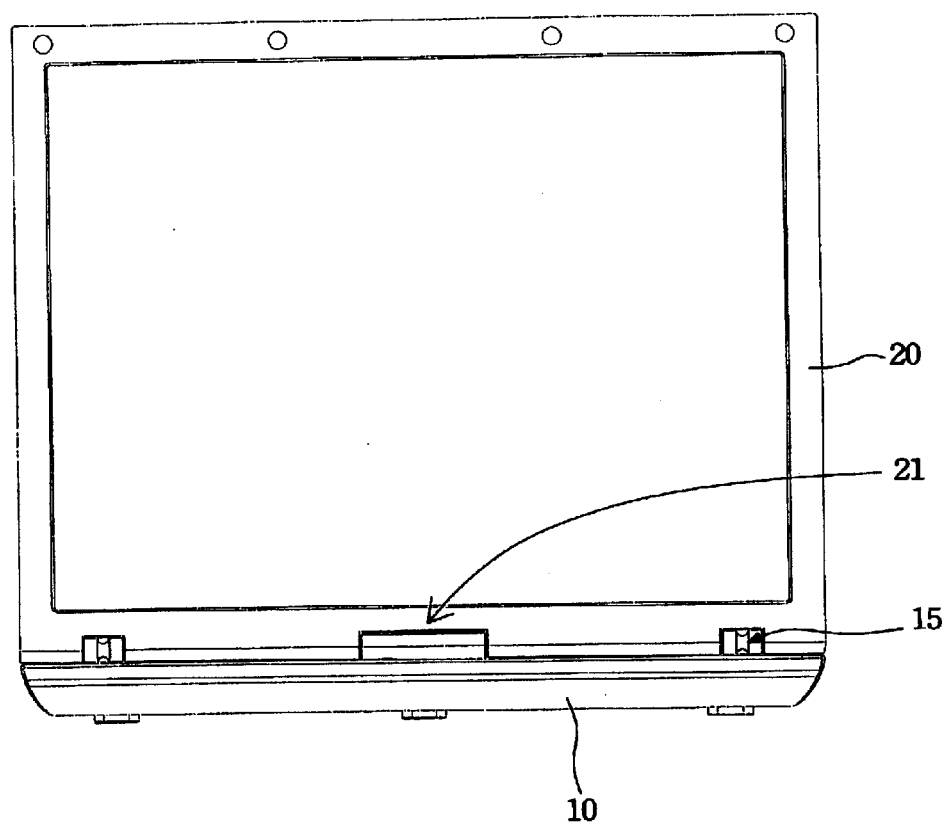
FIG. 3 illustrates a perspective view of support apparatus according to another preferred embodiment of this invention.

FIG. 3 illustrates a perspective view of support apparatus according to the preferred embodiment of this invention. Referring to FIG. 3, two assembled support apparatuses 15 are installed in the connecting gap between a LCD module and a computer mainframe. The two support apparatuses 15 are equidistant from the hinge 21. Referring to FIG. 2, the roller 18 is fastened to the LCD module, the holder 12 is fixed to the computer mainframe 10, and the roller support 16 and the spring 14 are installed between the roller 18 and the holder 12. Alternatively, the roller can be fastened to the computer mainframe and the holder can be fastened to the LCD module. The roller support and the spring are then installed between the roller and the holder. This alternative embodiment can also provide the same purpose and function as the last embodiment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A support apparatus installed in a connecting gap between a computer mainframe and a liquid crystal display (LCD) module, said LCD module being connected pivotally to said computer mainframe, said support apparatus comprising:
   a roller connected to said LCD module;
   a roller support connected to said roller;
   an elastic means, one end of said elastic means secured to said roller support; and
   a holder connected to another end of said elastic means and fixed on said computer mainframe, said roller being supported by said holder.

2. The support apparatus of claim 1, wherein said roller has a trench therearound.

3. The support apparatus of claim 2, wherein said holder is a semi sphere with a smooth surface and said semi sphere is employed to support said trench.

4. The support apparatus of claim 1, wherein said elastic means comprises a spring.

5. A support apparatus installed in a connecting gap between a computer mainframe and a LCD module, said LCD module being connected pivotally to said computer mainframe, said support apparatus comprising:
   a roller connected to said LCD module;
   an elastic means connected to said roller; and
   a support base, one end of said support base being connected to said elastic means, and another end of said support base being fixed to said computer mainframe, wherein said support base supports said roller by means of said elastic means's elastic forces.

6. The support apparatus of claim 5, wherein said support base further comprises a roller support and a holder.

7. The support apparatus of claim 6, wherein said roller support is fixed to said computer mainframe, said holder is supported by said elastic means, and said holder is connected to said roller.

8. The support apparatus of claim 5, wherein said elastic means comprises a spring.

9. A support apparatus installed in a connecting gap between a computer mainframe and a LCD module, wherein said LCD module is connected pivotally to said computer mainframe, said support apparatus comprising:
   a roller connected to said computer mainframe;
   a roller support connected to said roller;
   an elastic means, one end of said elastic means being secured to said roller support; and
   a holder connected to the other end of said elastic means and fixed on said LCD module, said roller being supported by said holder.

10. The support apparatus of claim 9, wherein said roller has a trench therearound.

11. The support apparatus of claim 9, wherein said holder is a semi sphere with a smooth surface and said semi sphere is employed to support said trench.

12. The support apparatus of claim 9, wherein said elastic means comprises a spring.

13. A support apparatus installed in a connecting gap between a computer mainframe and a LCD module, said LCD module being connected pivotally to said computer mainframe, said support apparatus comprising:
   a roller connected to said computer mainframe;
   an elastic means connected to said roller, and
   a support base, one end of said support base being connected to said elastic means, and another end of said support base being fixed to said LCD module, wherein said support base supports said roller by means of said elastic means's elastic forces.

14. The support apparatus of claim 13, wherein said support base further comprises a roller support and a holder.

15. The support apparatus of claim 14, wherein said roller support is fixed to said LCD module, said holder is supported by said spring, and said holder is connected to said roller.

16. The support apparatus of claim 13, wherein said elastic means comprises a spring.

* * * * *